United States Patent [19]
Gindler

[11] 3,884,637
[45] May 20, 1975

[54] METHOD AND COMPOSITION FOR THE DETERMINATION OF ALBUMIN
[75] Inventor: E. Melvin Gindler, Rockford, Ill.
[73] Assignee: Pierce Chemical Company, Rockford, Ill.
[22] Filed: Mar. 21, 1973
[21] Appl. No.: 343,438

[52] U.S. Cl. ............................. 23/230 B; 252/408
[51] Int. Cl. ..................... G01n 31/22; G01n 33/16
[58] Field of Search .................... 23/230 B; 252/408

[56] References Cited
UNITED STATES PATENTS
3,533,749   10/1970   Kleinman ......................... 23/230 B
3,558,278   1/1971   Louderback et al. ............. 23/230 B OTHER PUBLICATIONS
R. D. Swisher, Surfactant Biodegradation, 1970, Marcel Dekker, Inc., N.Y., pages 101-104, 114, relied on TP994 S9.

Primary Examiner—Robert M. Reese
Attorney, Agent, or Firm—Wolfe, Hubbard, Leydig, Voit & Osann, Ltd.

[57] ABSTRACT

A working solution and method for the spectrophotometric determination of albumin, employing a sulphonphthalein dye such as bromcresol green and a phosphate-containing anionic surfactant to prevent precipitation of protein-dye complexes.

13 Claims, No Drawings

METHOD AND COMPOSITION FOR THE DETERMINATION OF ALBUMIN

This invention relates to the determination of albumin in biologic fluids. More particularly, it relates to the spectrophotometric determination of albumin using a sulphonphthalein dye.

The spectrophotometric determination of albumin in biologic fluids using a sulphonphthalein dye such as bromcresol purple or bromcresol green has been known for a number of years (see, for example, Louderback et al., U.S. Pat. No. 3,558,278 and Kleinman, U.S. Pat. No. 3,533,749. Kleinman has identified certain problems associated with the use of such dyes including a large absorbance of the reagent blank and that the use of dye concentrations which optimize sensitivity and linearity of the measurement cause turbidity due to precipitation of the protein-dye complex. Kleinman states that it was "found that the inclusion of a small quantity of non-ionic surface active agent or a mixture of different surface active agents prevent the protein-dye complex from precipitating out of solution thereby eliminating the problem of turbidity. In addition, a marked reduction in the observed absorption of the reagent blank is also obtained." (Col. 2, lines 25-31).

In accordance with the present invention, it has been found that the spectrophotometric determination of albumin in a biologic fluid can be accurately accomplished with a sulphonphthalein dye and without adverse turbidity effects by including in the sample being analyzed, as well as in the standards used for calibration, a small amount of an anionic surfactant containing one or more phosphate groups per molecule in terminal or other positions. More particularly, anionic surfactants useful in the present invention are water soluble salts of phosphate esters of hydrophobic alcohols having at least about eight carbon atoms in either straight chain, branched or cyclic configuration as well as combinations thereof.

Representative examples of hydrophobic alcohols which can be employed in preparing useful phosphate esters include alcohols of the following: alkyl, aryl and alkylarlyl terminated ethylene oxide adducts; alkene oxide polymers such as block copolymers of ethylene and propylene oxide; aliphatic and aromatic ethers or thioethers; alkyl and fluoroalkyl hydrocarbons, Examples of other useful hydrophobic alcohols, which will be readily apparent to those skilled in the art, are given in McCutcheron's, Detergents and Emulsifiers, 1970 Annual, pp. 279-300, Allured Publishing Co.

Particularly preferred anionic surfactants useful herein are those having the following structure:

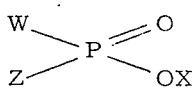

wherein:
X is sodium, potassium, ammonium, or an organic amine such as monoethanal amine;
W is RO $(CH_2CH_2O)_n$—;
Z is W or XO —;
$n$ is about 1–30 and, preferably, 2–10; and
R is an alkylaryl radical having about 10–30 and, preferably, 14–22, carbon atoms in the alkyl moiety thereof.

Mixtures of the anionic surfactants identified above can also be used. An especially preferred anionic surfactant is that sold under the tradename of Gafac-LO-529 which is identified as a partial sodium salt of a mixture of mono and diphosphate esters having a specific gravity (25°C) of 1.05–1.15, a pour point (ASTM) of 6°C, an acid number (mg KOH/g product) of approximately 35 to the second inflection point (pH 9–9.5) and a pH of 5–6 (10% solution at 25°C).

Bromcresol green is the preferred sulphonphthalein dye for use in combination with the above-identified anionic surfactant. However, other sulphonphthalein dyes such as bromphenol blue, bromcresol purple, etc. which bind albumin and, in bound form, exhibit a change in spectra from the free dye are also believed to be useful. Based on the weight of the biologic fluid sample being analyzed, customary dye concentrations on the order of about 0.5–5% and, preferably, 2–2.5%, are useful. And, in combination with these dye concentrations and again based on weight of the sample, the anionic surfactant or mixture thereof can be employed in an amount of about 40–300% and, preferably, 65–85%.

In keeping with the present invention, customary methods of spectrophotometric analysis of biologic fluids can be used. Thus, in addition to the presence of the dye and anionic surfactant, the biologic fluid being analyzed should also contain a suitable buffer in order to adjust the pH of the sample to a level where sensitivity is optimized. While simple experimentation can be used to ascertain the most appropriate pH for a given system, with the use of bromcresol green dye, a pH of about 4.6–4.8 has been found to be most appropriate. At a substantially lower pH, e.g., 4.2, significant precipitation occurs while, at a higher pH the effect of albumin concentration on absorbance is difficult to ascertain.

For use with bromcresol green, a citric acid-citrate buffer has been found to be suitable in achieving an appropriate pH. Also, as is well known, in addition to a buffer other ingredients are frequently present during analysis such as preservatives which serve to prevent microbial growth and chelating agents such as iminodiacetic acid derivatives which prevent interference by multivalent metals. Useful iminodiacetic acid derivatives are identified in my copending application entitled "Determination of Amylase," Ser. No. 335,736, filed Feb. 26, 1973.

The following example illustrates the present invention. All parts and percentages are by weight unless otherwise indicated.

EXAMPLE 1

A working reagent solution was prepared by adding the following ingredients in the indicated amounts to 16 liters of water:
275 grams of trisodium citrate dihydrate
130 grams citric acid monohydrate
15.5 grans EDTA (ethylenediaminetetracetic acid disodium salt dihydrate)
90 grams Gafac-LO-529 (about 88% surfactant content and 12% water)
2.33 grams bromcresol green dye
3.00 ml. of this solution is then added to 0.020 ml. of serum. The optical absorbance of this solution is then read at wave length of 590–660 nm and, preferably, 630 nm, using a conventional spectrophotometer. Similar readings are made on samples containing known albumin concentrations varying from about 0 grams of albumin to about 6 grams of albumin per 100 ml. of sample and a calibration graph constructed (follows Beer's Law over this range). The concentration of albumin in the biologic fluid sample being analyzed is readily determined from the graph.

As illustrated above, the determination of albumin can be easily accomplished with the use of a single aqueous working reagent solution. And, therefore, a further aspect of this invention resides in providing a novel solution for the spectrophotometric determination of albumin. This solution contains, as essential ingredients, sufficient water to form a handleable solution, a sulphonphthalein dye in at least an amount sufficient to bind the albumin anticipated in the sample to be analyzed and the anionic surfactant in an amount to substantially diminish any adverse effects of turbidity. As mentioned earlier a buffer is generally necessary to provide a solution pH where sensitivity is enhanced. Also, as indicated, other ingredients can be present in the solution which do not detract from the accuracy or advantages of the process herein illustrated.

Preferred working solutions such as specifically illustrated in Example 1 can, based on the weight of the solution, contain about 0.2–2% and, preferably 0.4–1.8%, anionic surfactant and about 0.003–0.044% and, preferably 0.012–0.022%, dye.

I claim as my invention:

1. In a method for the determination of albumin comprising adding to an albumin containing biologic fluid an aqueous solution containing a sulphonphthalein dye buffered to an appropriate pH for sensitive spectrophotometric analysis and thereafter spectrophotometrically measuring the absorbance of the solution so formed; the improvement wherein the aqueous solution added to the biologic fluid contains a water soluble, phosphate containing anionic surfactant formed from a hydrophobic alcohol having at least eight carbon atoms, said anionic surfactant being present in an amount sufficient to prevent precipitation of protein-dye complexes.

2. The method of claim 1 wherein the sulphonphthalein dye is bromcresol green.

3. The method of claim 2 wherein the anionic surfactant has the following structure:

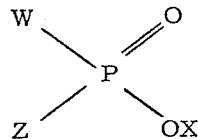

Wherein:
X is sodium, potassium, ammonium, or an organic amine;
W is RO $(CH_2CH_2O)_n$ —;
Z is W or XO —;
$n$ is about 1–30 and
R is an alkylaryl radical having about 10–30 carbon atoms in the alkyl moiety thereof.

4. The method of claim 3 wherein $n$ is 2–10 and R is an alkyl radical having 14–22 carbon atoms 5. The method of claim 4 wherein, based on the weight of the biologic fluid, the anionic surfactant is present in an amount of about 65–85%.

6. The method of claim 4 wherein the anionic surfactant is further characterized as a partial sodium salt of a mixture of mono and diphosphate esters having a specific gravity (25°C) of 1.05–1.15, a pour point (ASTM) of 6°C, an acid number (mg KOH/g product) of approximately 35 to the second inflection point (pH 9–9.5) and pH of 5–6 (10% solution at 25°C).

7. The method of claim 4 wherein, based on the weight of the biologic fluid, the anionic surfactant is present in an amount of about 40–300%.

8. The method of claim 7 wherein the anionic surfactant is further characterized as a partial sodium salt of a mixture of mono and diphosphate esters having a specific gravity (25°C) of 1.05–1.15, a pour point (ASTM) of 6°C, an acid number (mg KOH/g product) of approximately 35 to the second inflection point (pH 9–9.5) and a pH of 5–6 (10% solution at 25°C).

9. The method of claim 8 wherein the dye is present in an amount of about 0.5–5%, based on the weight of the biologic fluid.

10. An aqueous solution useful in the spectrophotometric determination of albumin which consists essentially of water, a sulphonphthalein dye, and a water soluble, phosphate containing anionic surfactant formed from a hydrophobic alcohol having at least eight carbon atoms.

11. The solution of claim 10 which contains a buffer.

12. The solution of claim 11 wherein the dye is bromcresol green.

13. The solution of claim 12 wherein the anionic surfactant is characterized as a partial sodium salt of a mixture of mono and diphosphate esters having a specific gravity (25° C.) of 1.05–1.15, a pour point (ASTM) of 6° C., an acid number (mg KOH/g product) of approximately 35 to the second inflection point (pH 9–9.5) and a pH of 5–6 (10% solution at 25° C.).

* * * * *